Dec. 2, 1924.

S. H. GOLDBERG 1,517,834

MACHINE FOR FORMING HAIRPINS OR SIMILAR ARTICLES

Original Filed Feb. 23, 1918　　7 Sheets-Sheet 1

Dec. 2, 1924.
1,517,834
S. H. GOLDBERG
MACHINE FOR FORMING HAIRPINS OR SIMILAR ARTICLES
Original Filed Feb. 23, 1918    7 Sheets-Sheet 4

Dec. 2, 1924.
1,517,834
S. H. GOLDBERG
MACHINE FOR FORMING HAIRPINS OR SIMILAR ARTICLES
Original Filed Feb. 23. 1918    7 Sheets—Sheet 6

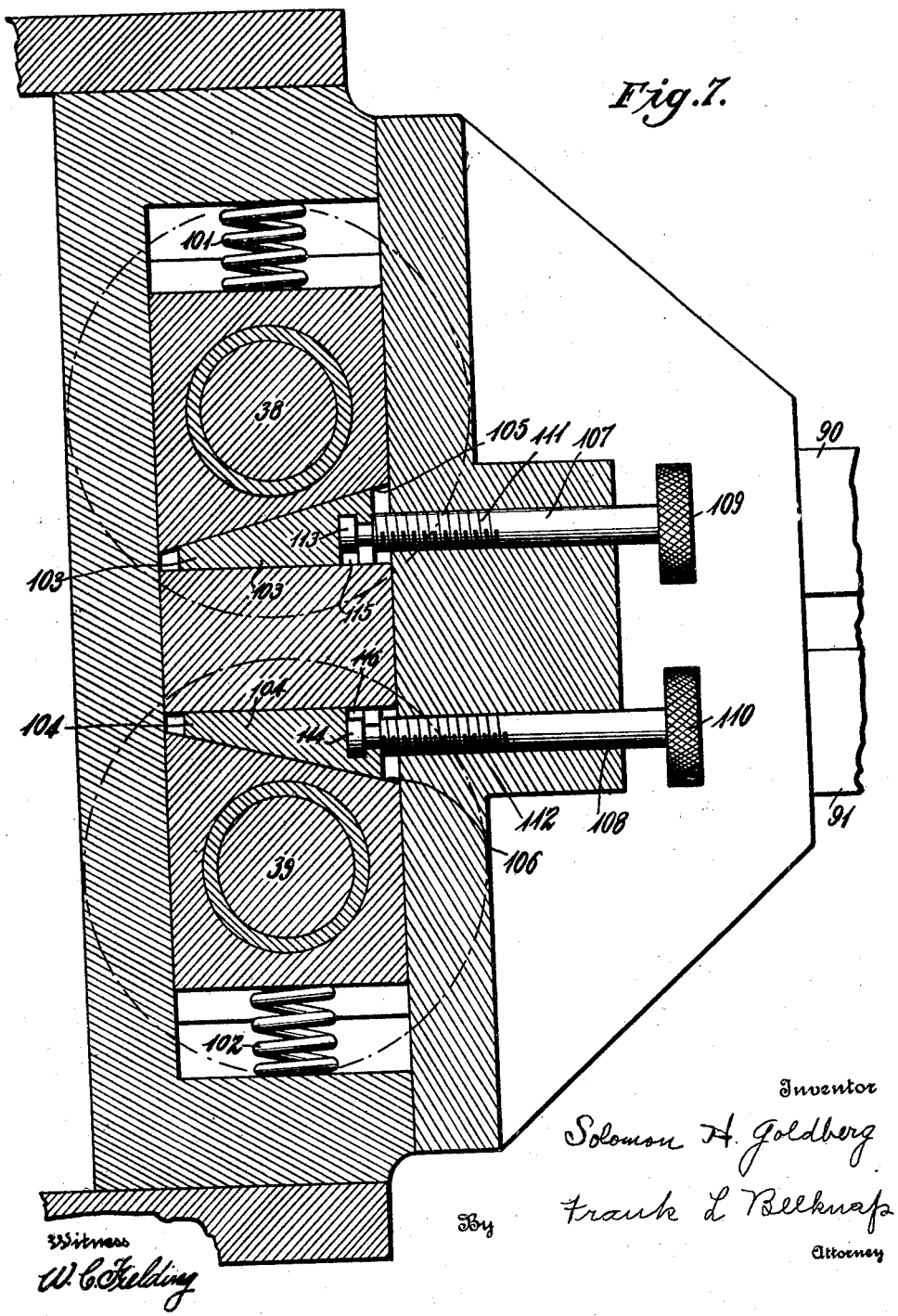

Patented Dec. 2, 1924.

1,517,834

UNITED STATES PATENT OFFICE.

SOLOMON H. GOLDBERG, OF CHICAGO, ILLINOIS, ASSIGNOR TO THE HUMP HAIRPIN MANUFACTURING COMPANY, OF CHICAGO, ILLINOIS, A CORPORATION OF WEST VIRGINIA.

MACHINE FOR FORMING HAIRPINS OR SIMILAR ARTICLES.

Original application filed February 23, 1918, Serial No. 218,628. Divided and this application filed August 11, 1919, Serial No. 316,796. Renewed May 5, 1924.

*To all whom it may concern:*

Be it known that I, SOLOMON H. GOLDBERG, a citizen of the United States, residing in the city of Chicago, county of Cook, and State of Illinois, have invented certain new and useful Improvements in Machines for Forming Hairpins or Similar Articles, of which the following is a specification.

This invention relates to a new and improved machine for forming hairpins or similar articles from a reel or other continuous supply of wire stock, although the invention in certain of its aspects is not limited to use with a continuous machine.

This application is a division of an original application filed on the same invention, February 23, 1918, Serial No. 218,628.

In general the type of machine to which my invention relates is one in which the hairpin or similar article is automatically severed and formed into the desired shape while being advanced through the machine and among the salient objects of the invention are to provide improved mechanism whereby the wire is fed forward, straightened, severed, its severed ends ground or polished and is then bent and crimped into its final shape without the necessity of any manual control other than starting the machine; to provide improved means for compensating for wires of different thicknesses; and to provide the construction in which the size and shape of the crimp can be readily changed without materially altering the machine.

In the drawings:

Fig. 7 is a transverse cross section of applicant's construction, shown in Fig. 5 in partial longitudinal section showing the sliding blocks for adjusting the crimping rolls.

Figure 1:
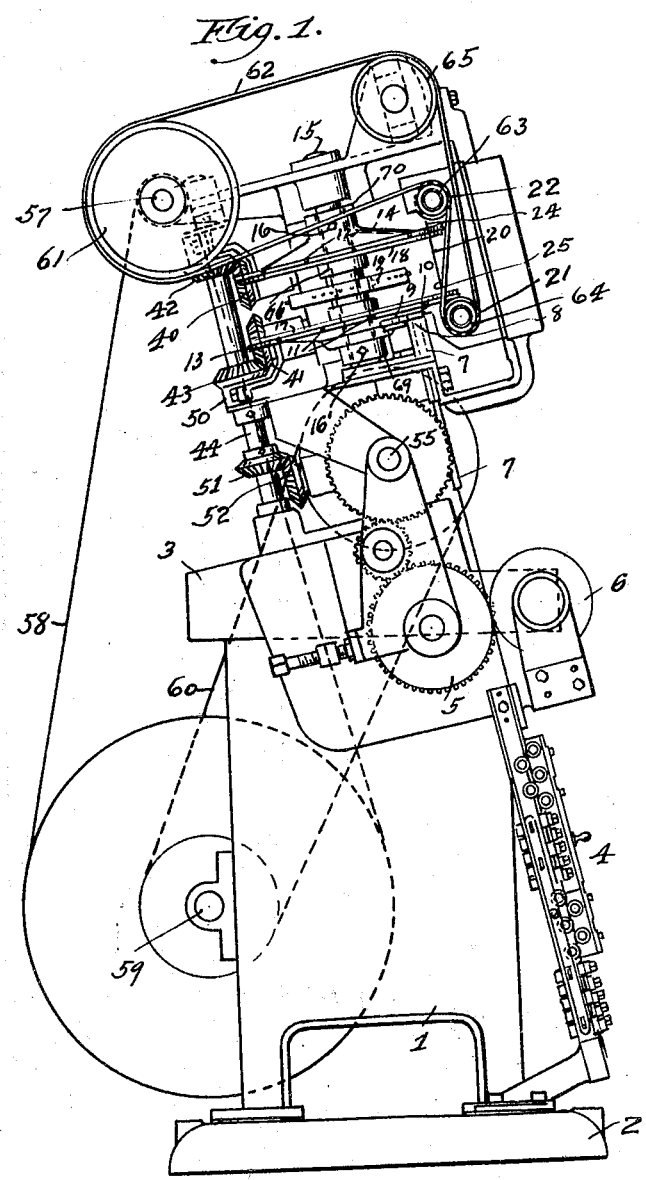
Fig. 1 is an end elevational view of a machine embodying my invention, parts being omitted for the sake of clearness.

Taking up in detail the particular construction disclosed in the drawings, 1 designates the frame of the machine mounted on a suitable base 2 and supporting a bed plate 3 on which the most of the mechanism is mounted. The wire coming from the reel or other source of stock (not shown), is drawn through the wire straightener 4 by means of the feeding rolls 5 and 6, is then forced upward through the guide pipe or channel 7, the upper end 8 of which forms a part of the severing mechanism. This end 8 is arranged so that the cutters 9 on the rotating head 10 will sever the wire on the plane of the upper end 8 of the conduit 7. The severed length of wire is then engaged by lugs 11 and 12 distributed around a periphery of the rotating discs 13 and 14 respectively. These discs are spaced apart a distance proportionate to the length of the individual pieces of wire and in case a pin or other article of greater length is to be produced, the upper disc 14 can be spaced a greater distance from the lower disc 13. This is accomplished by setting the disc 14 further up upon the shaft 15 and locking the set screw 16.

Figure 2:
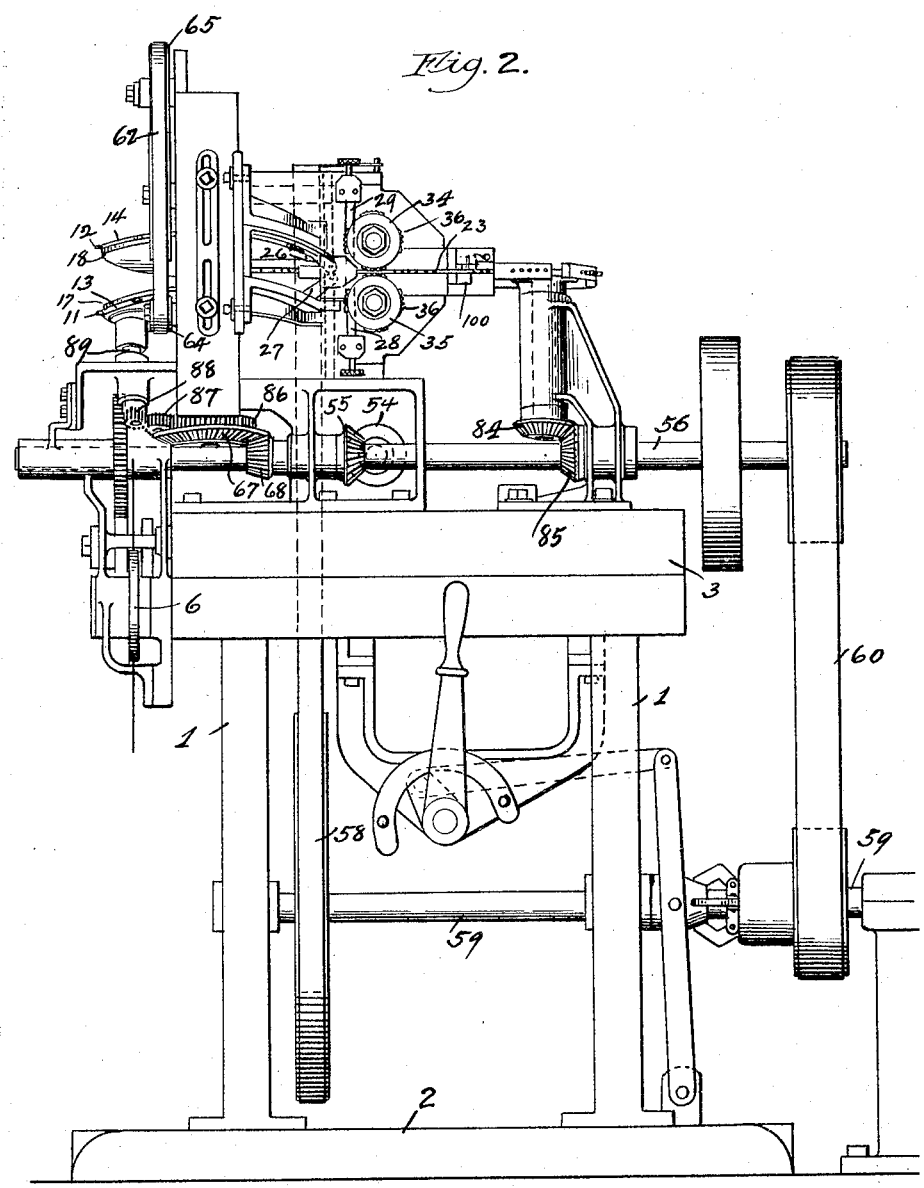
Fig. 2 is a front elevational view similar to Fig. 1.
Figure 3:
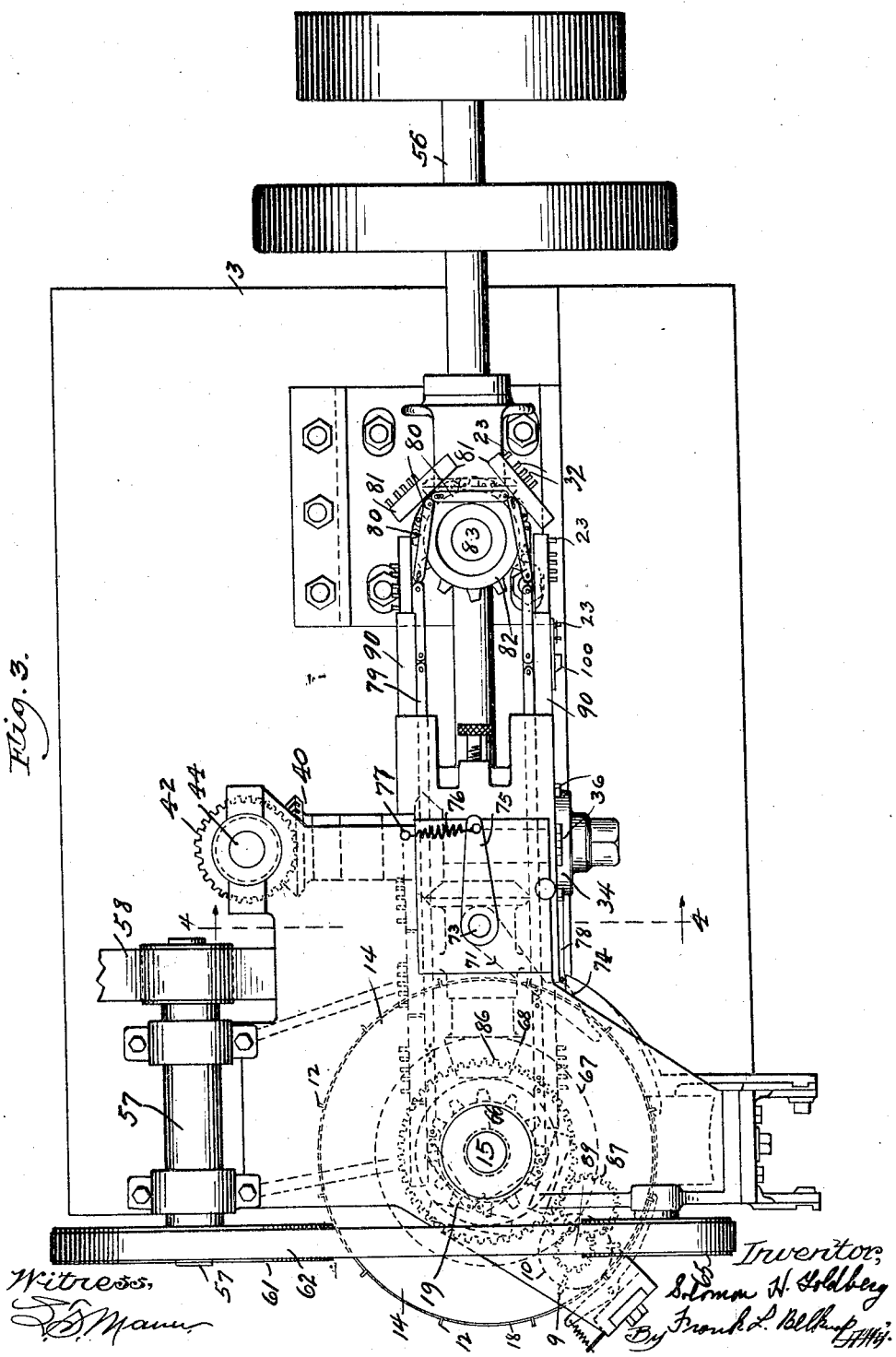
Fig. 3 is a top plan view similar to Fig. 1.
Figure 4:
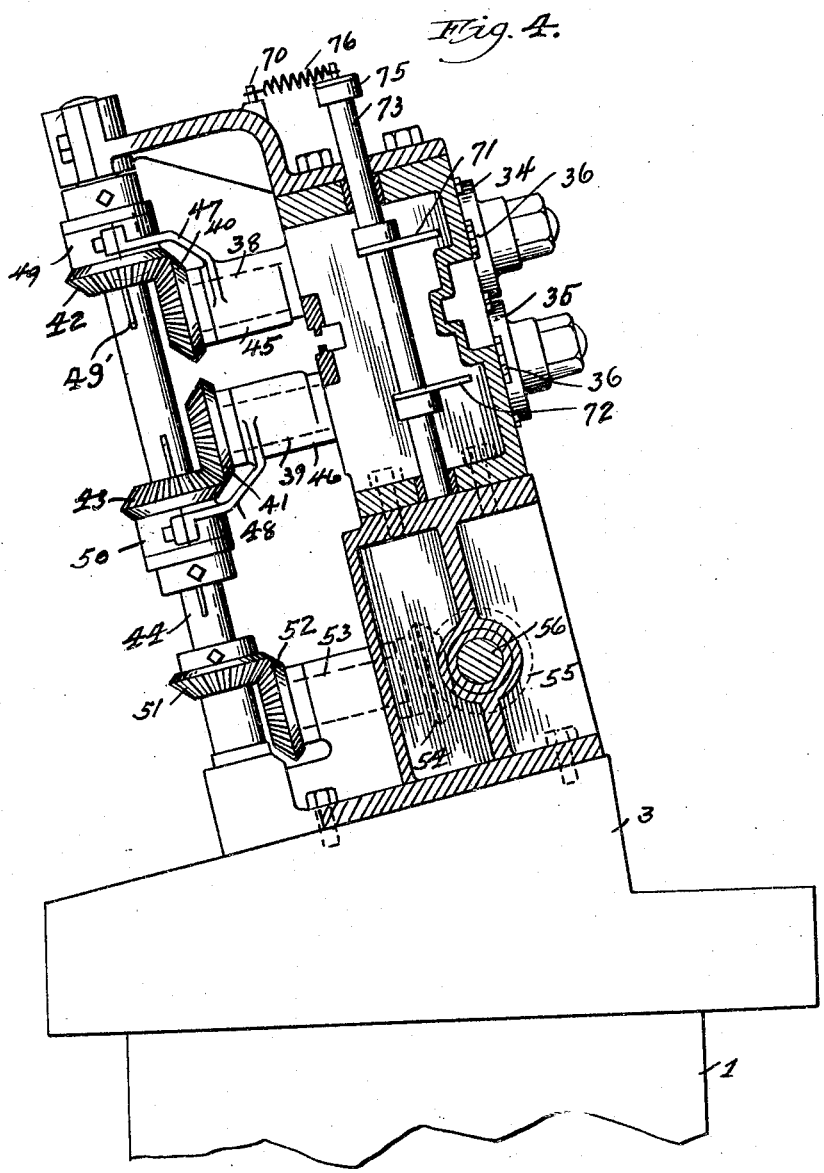
Fig. 4 is a cross section view, line 4—4 of Fig. 3, looking in the direction of the arrows.
Figure 5:
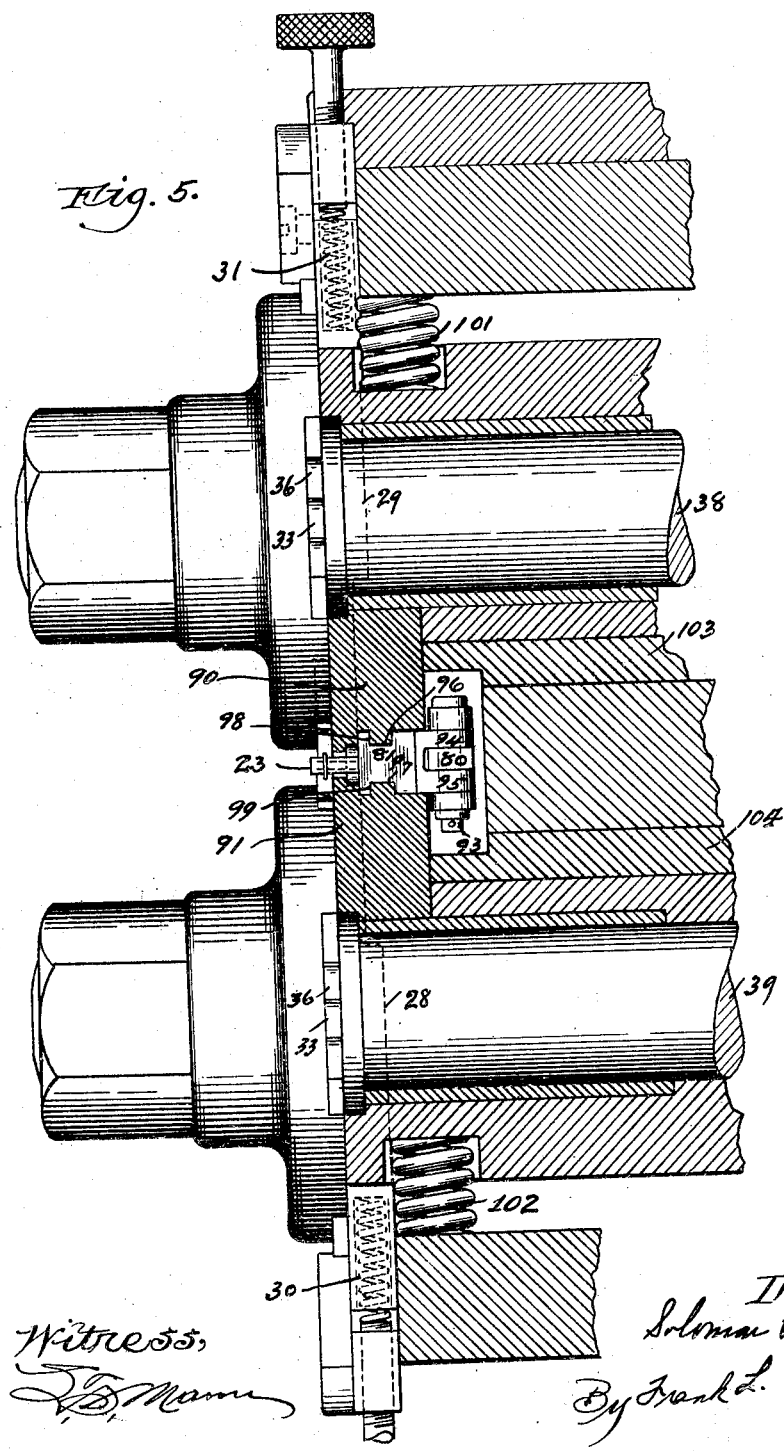
Fig. 5 is an enlarged elevational view of the crimping rolls with other parts shown in section.

It will be noticed that a second pair of discs 17 and 18 are arranged intermediate the discs 13 and 14. The second set of discs are of slightly greater diameter than the first set and are driven independently thereof by a chain drive extending over the sprocket 19. The purpose of driving the discs 17 and 18 at a higher rate of speed than the discs 13 and 15, is to compel the rotation of the wire length 20 about its axis simultaneously with its advancement from the point of severance to the chain feed hereinafter described. This axial rotation of the wire length is used for rounding off or smoothing the rough severed ends of the wire length after which the length is given its initial bend and transferred to the chain feed where the remaining bending and crimping operations are performed. After passing through the filing rolls 21 and 22, the severed length is transferred from the disk feed to the chain feed as follows:

The lugs 23 on the chain feed come into registration and strike against the central part of the wire length and as the chain feed departs from the disc feed, it caries with it a wire length, drawing from the ends 24 and 25 of the wire between the initial bending devices 26 and 27, Fig. 2. This initially bends the wire and also forms the first step in the production of the head of the hairpin.

After passing from the initial bending device the wire length is drawn between the spring pressed longitudinally adjustable bars 28 and 29 which are pressed towards each other by springs 30 and 31 respectively. The wire length which is still hooked over one of the lugs 23 is then drawn between the crimping rolls, the construction and operation of which is as follows: Just in the rear of the lug 23 is a plurality of lugs 32 which cooperate with detents 33 in the crimping rolls 34 and 35. In order to facilitate the use of the machine in producing hairpins or like articles of different sizes and figurations, the detents 33 are formed in removable blocks 36 which blocks are detachably fastened to the forming rolls by screws or other quick attachment means 37.

The drive for the crimping rolls 34 and 35 comprises a pair of shafts 38 and 39, which, at their opposite ends are provided with beveled gears 40 and 41 which mesh with beveled gears 42 and 43 on an upright shaft 44. The shafts 38 and 39 are supported in bearings 45 and 46 which are connected by integral brackets 47 and 48 in fixed relation to the bearings 49 and 50 of the vertical shaft. By this arrangement the greater rigidity is given to the supporting mechanism for the driving shafts and the lost motion which occurs from the use of a large number of spur gears is avoided. At its lower end, the vertical shaft 44 has a beveled gear 51 meshing with a beveled gear 52 on the stub shaft 53 which shaft in turn is driven through gears 54 and 55 from the main drive shaft 56. The gears 49 and 50 are connected to the shaft 44 by the spline connections 49'.

At the upper end of the frame work there is arranged a counter shaft 57 which is driven by a belt 58 from the lower drive shaft 59. This shaft also has a driving connection through a belt 60 to the main drive shaft 56 for the forming rolls. Mounted on the shaft 57 is a belt wheel 61 over which there extends a belt 62. This belt extends around the pulley 63 which drives the file roll 22 and is then looped around the pulley 64 so as to drive the file roll 21 in the opposite direction. From the roll 64 it is continued over a tension adjusting roll 65.

As previously stated the severed lengths are carried from the point of severance to the point of transfer from the disc feed to the chain feed by means of the lugs 11 and 12 on the discs 13 and 14. The drive for the rotating discs comprises a sleeve 66 which at its lower end is provided with a beveled gear 67 which meshes with a beveled pinion 68 on the shaft 55. The discs 13 and 14 are removably mounted on the sleeve 66 by means of integral hubs 69 and 70 and are locked to rotate with the sleeve by means of set screws 16 and 16'. The second pair of discs 17 and 18 are rotatably mounted or journaled on the outer surface of the sleeve 66 and are driven from a sprocket 19 or other suitable mechanism at a higher rate than the discs 13 and 14, as previously mentioned.

In transferring the wire length from the disc feed to the chain feed there is employed an automatic transfer device, comprising a pair of rock arms 71 and 72 mounted on the shaft 73. Each of these rock arms are provided at their outer end with a beveled face 74 which extends diagonally in the path of the wire length 20 which is being advanced by the lugs 11 and 12, therefore as the wire lengths are advanced, they will press against the inclined face 74 of the rock arms and cause the latter to move backward and rock the pivot shaft 73. The latter has fixedly mounted on its upper end, an arm 75, which is connected by a spring 76 to a stationary lug 77. The arrangement of parts is such that whenever the pin reaches the transfer position 78, it is automatically adjusted to move with the chain feed, the drive connection for which feed is as follows: The chain feed comprises an endless belt 79 made up of links 80 to which there is pivotly connected the blocks 81 carrying the pins 23 and 32. This chain 79 at one end, extends over a sprocket 82 and at its other end over a sprocket 19. The driving force for the chain is through the shaft 83 and beveled gear 84 which meshes with a beveled gear 85 on the shaft 56.

The shaft 56 also forms part of a drive connection for the wire cutter disc 10. This drive connection comprises a gear 86 fixed to rotate with the beveled gear 67 which is driven from pinion 68 and the shaft 55. This gear 86 through an intermediate gear 87 meshes with the gear cutter pinion 88 on the lower end of the shaft 89. From the above description it will be noticed that all of the moving parts of the machine are driven in timed relation to each other so that in case of any increase or decrease in the speed of the operation of the machine, it will not affect the relative operations of the individual mechanism.

To properly guide the chain during this travel, it is mounted in guide bars 90 and 91 in the following manner. The blocks 81 are connected by vertical pivot pins 93 to projecting ears 94 and 95 which in turn are mounted on sliding blocks 81. The ears 94 and 95 are spaced apart to permit of the pivot pins 93 also connecting the links 80, this arrangement of parts facilitating the turning of the corners when the belt or chain is driven. The blocks 81 during the greater part of their travel are in engagement with the guide bars 91 and 90 and for this purpose the blocks 81 are provided with upper and lower recesses 96 and 97 which receive longitudinal projections 98 and 99 on the guide bars 90 and 91 respectively. After the completed pin has been formed, it is discharged from the lugs and blocks by a beveled face 100 which is held in the path of the blocks.

Figure 6:
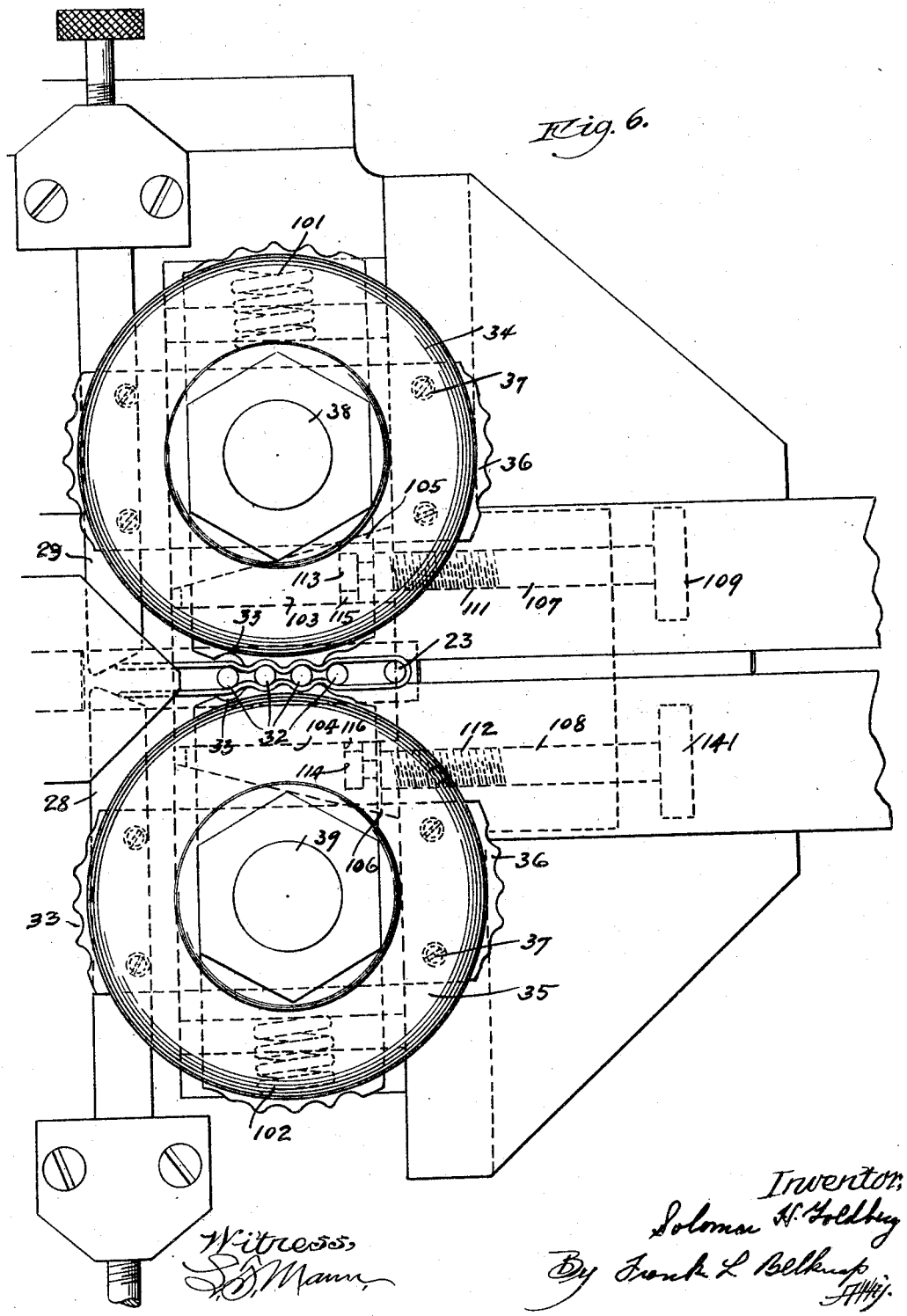
Fig. 6 is an enlarged fragmentary side elevational view showing the crimping rolls in operation.

A still further feature of the invention resides in the novel adjustment mechanism for the crimping rolls 34 and 35 whereby the latter can be accurately adjusted a greater distance apart to adapt the machine for use in connection with larger size pins or pins made from wire of different gauge. Normally the blocks carrying the crimping rolls 34 and 35 are pressed toward each other and toward the pins 23 and 32 by means of coil springs 101 and 102. The amount of movement towards each other is, however, limited by sliding blocks 103 and 104, which have beveled faces 105 and 106 on the bearing blocks for the crimping rolls. These sliding blocks are adjusted in and out by means of threaded bolts 107 and 108 which have suitable knurled heads 109 and 110. These bolts have a threaded engagement at 111 and 112 with the frame work and at their inner ends have heads 113 and 114 which fit into grooves 115 and 116 in the sliding blocks. Therefore, movement of the threaded bolts in one direction will withdraw the blocks to the right of position shown in Fig. 6 and allow the crimping rolls to come closer together. On the other hand, an adjustment of the threaded bolts in the opposite direction will force the sliding blocks to the left and spread the crimping rolls apart. In this manner, a very accurate adjustment of the crimping rolls with reference to each other and the cooperating forming pins is obtained and this is accomplished without varying the tension on the wire.

While I have shown and described in detail certain adjustments and certain mechanisms for driving various parts of the machine, the invention is not limited to such features except as ultimately set forth in the claims.

I claim as my invention:

1. In a machine for forming hairpins, the combination with a pair of discs, mounted die members thereon, sets of pins adapted to be engaged by the die members, the die members of the respective discs adapted to cooperate with the sets of pins passing therebetween during rotation to form the hairpins, adjusting means on the ends of the shafts comprising sliding wedge blocks cooperating with the shafts and cooperating springs for adjusting the position of the discs relative to each other.

2. In a machine for forming hairpins, the combination with a pair of discs, mounted die members thereon, sets of pins adapted to be engaged by the die members, the die members of the respective discs adapted to cooperate with the sets of pins passing therebetween during rotation to form the hairpins, adjusting means on the ends of the shafts comprising sliding wedge blocks cooperating therewith, compression springs for adjusting the positioning of the discs relative to each other, and slidable bearings on the opposite ends of said shafts to compensate for the wedge block adjustment.

3. In a machine for forming hairpins, the combination with a pair of parallel shafts having forming discs with adjustable die members mounted in regular spaced relation on the outer peripheries of the discs, of cooperating pins adapted to pass between said rolls and operable with rotating die members in forming the pins, wedge blocks for adjusting the relative position of the discs, and slidable bearings at the opposite ends of the shafts for compensating for the wedge block adjustments at the disc ends.

4. In a machine for forming hairpins or similar articles, the combination with forming rolls mounted on shafts of cooperating forming pins adapted to pass between said rolls, means for adjusting said rolls to various positions with reference to each other and said cooperating pins, said adjusting means comprising a sliding wedge block and a threaded bolt for adjusting said wedge block longitudinally and cooperating with springs for pressing said rolls towards each other and a slidable adjustment on the opposite end of said shafts for compensating for the roll adjustment.

SOLOMON H. GOLDBERG.